United States Patent
Liang et al.

(10) Patent No.: US 11,231,609 B2
(45) Date of Patent: Jan. 25, 2022

(54) DISPLAY SUBSTRATE AND FORMING METHOD THEREOF, DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fei Liang, Beijing (CN); Pengtao Li, Beijing (CN); Xiuyun Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 696 days.

(21) Appl. No.: 16/082,440

(22) PCT Filed: Dec. 19, 2017

(86) PCT No.: PCT/CN2017/117083
§ 371 (c)(1),
(2) Date: Sep. 5, 2018

(87) PCT Pub. No.: WO2018/166260
PCT Pub. Date: Sep. 20, 2018

(65) Prior Publication Data
US 2021/0200019 A1 Jul. 1, 2021

(30) Foreign Application Priority Data
Mar. 17, 2017 (CN) .......................... 201710159830.2

(51) Int. Cl.
*G02F 1/1335* (2006.01)

(52) U.S. Cl.
CPC .. *G02F 1/133512* (2013.01); *G02F 1/133528* (2013.01)

(58) Field of Classification Search
CPC ................................. G02F 1/133512
See application file for complete search history.

(56) References Cited

U.S. PATENT DOCUMENTS

| | | | |
|---|---|---|---|
| 2005/0174529 A1* | 8/2005 | Fukushima | G02F 1/1323 349/197 |
| 2008/0080040 A1* | 4/2008 | Mimura | G02B 5/201 359/238 |

(Continued)

FOREIGN PATENT DOCUMENTS

| | | |
|---|---|---|
| CN | 103591514 A | 2/2014 |
| CN | 103792703 A | 5/2014 |

(Continued)

OTHER PUBLICATIONS

International Search Report and Written Opinion for Application No. PCT/CN2017/117083, dated Mar. 15, 2018, 13 Pages.

(Continued)

*Primary Examiner* — Edmond C Lau
(74) *Attorney, Agent, or Firm* — Brooks Kushman P.C.

(57) ABSTRACT

A display substrate and a forming method thereof, a display panel and a display device are provided. The display substrate includes: a base substrate, a display functional layer on the base substrate, and an optical structure arranged at a side of the base substrate. The optical structure is used to control an emergent angle of light from the display functional layer to be within a predetermined angle range.

12 Claims, 4 Drawing Sheets

(56) References Cited

U.S. PATENT DOCUMENTS

| | | | |
|---|---|---|---|
| 2010/0265435 A1* | 10/2010 | Hwang | G02F 1/133504 |
| | | | 349/64 |
| 2015/0009563 A1* | 1/2015 | Lauters | G02B 5/003 |
| | | | 359/485.03 |
| 2016/0011411 A1 | 1/2016 | Wang et al. | |
| 2016/0282650 A1 | 9/2016 | Qin et al. | |

FOREIGN PATENT DOCUMENTS

| | | |
|---|---|---|
| CN | 104090378 A | 10/2014 |
| CN | 205038364 U | 2/2016 |
| CN | 205720964 U | 11/2016 |
| CN | 106647013 A | 5/2017 |
| JP | 2013190608 A | 9/2013 |

OTHER PUBLICATIONS

International Search Report and Written Opinion, English Translation.
CN103591514A, English Abstract and Translation.
CN103792703A, English Abstract and U.S. Equivalent U.S. Pub. No. 2016/0282650.
CN104090378A, English Abstract and U.S. Equivalent U.S. Pub. No. 2016/0011411.
CN106647013A, English Abstract and Translation.
CN205038364U, English Abstract and Translation.
CN205720964U, English Abstract and Translation.
JP2013190608A, English Abstract and Translation.

* cited by examiner

DISPLAY SUBSTRATE AND FORMING METHOD THEREOF, DISPLAY PANEL AND DISPLAY DEVICE

CROSS-REFERENCE TO RELATED APPLICATIONS

This application is the U.S. national phase of PCT Application No. PCT/CN2017/117083 filed on Dec. 19, 2017, which claims priority to Chinese Patent Application No. 201710159830.2 filed on Mar. 17, 2017, which are incorporated herein by reference in their entireties.

TECHNICAL FIELD

The present disclosure relates to a display substrate and a forming method thereof, a display panel and a display device.

BACKGROUND

Liquid crystal display technology has been a mainstream display technology in the market and can meet people's requirements on various aspects such as pixel definition, response time and screen size. However, in some specific displaying environments, people requires specific displaying modes to meet specific requirements. For example, in office environment or vehicle displaying environment, people needs to limit a viewing angle of a display screen to achieve privacy displaying or prevent generating reflection in vehicle displaying.

SUMMARY

Technical solutions of embodiments of the present disclosure are given as follows.

In one aspect, a display substrate is provided, including: a base substrate; a display functional layer on the base substrate; and an optical structure at a side of the base substrate. The optical structure is used to control an emergent angle of light from the display functional layer to be within a predetermined angle range Optionally, the optical structure includes a plurality of light-shielding patterns spaced from each other. An extending direction of each light-shielding pattern is perpendicular to a first plane. The first plane is parallel to the base substrate.

Optionally, each light-shielding pattern has a uniform width a in a direction perpendicular to the extending direction. Furthermore, an emergent angle of an emergent light via the optical structure at the first plane is smaller than a threshold $\Theta$, a height of the light-shielding pattern is h, and a distance between adjacent light-shielding patterns is b, where $\Theta=\arctan(b/h)$.

Optionally, the display substrate includes a plurality of pixel regions. A width of each pixel region is d, and a sum of a and b is not smaller than d and not larger than 2d.

Optionally, in a direction perpendicular to the extending direction, a width of a portion of each light-shielding pattern close to the base substrate is smaller than a width of a portion of the light-shielding pattern away from the base substrate.

Optionally, the optical structure is arranged at a side of the base substrate away from the display functional layer.

Optionally, the optical structure further includes a transparent pattern filled between adjacent light-shielding patterns.

Optionally, a height of the transparent pattern is equal to the height of each light-shielding pattern.

A method for forming a display substrate is provided in an embodiment of the present disclosure, including: providing a base substrate; forming a display functional layer on the base substrate; and forming an optical structure at a side of the base substrate. The optical structure is used to control an emergent angle of light from the display functional layer to be within a predetermined angle range.

Optionally, the step of forming the optical structure at the side of the base substrate includes: directly forming the optical structure on a surface of the base substrate away from the display functional layer.

Optionally, the step of forming the optical structure at the side of the base substrate away from the display functional layer includes: forming a light-shielding layer at the side of the base substrate away from the display functional layer; and patterning the light-shielding layer to form a plurality of light-shielding patterns spaced from each other. An extending direction of each light-shielding pattern is perpendicular to a first plane, and the first plane is parallel to the base substrate Optionally, each light-shielding pattern has a uniform width a in a direction perpendicular to the extending direction. In addition, n emergent angle of an emergent light via the optical structure at the first plane is smaller than a threshold $\Theta$, a height of each light-shielding patterns is h, and a distance between adjacent light-shielding patterns is b, where $\Theta=\arctan(b/h)$.

Optionally, after the step of forming the plurality of light-shielding patterns spaced from each other, the method further includes: filling transparent materials between adjacent light-shielding patterns.

A display panel is further provided in an embodiment of the present disclosure, including the above-described display substrate.

Optionally, the display panel is a liquid crystal display panel. The display panel includes a color filter substrate and an array substrate that are arranged opposite to each other. The display substrate is the color filter substrate and the optical structure is at a side of the color filter substrate away from the array substrate; or the display substrate is the array substrate and the optical structure is at a side of the array substrate away from the color filter substrate.

Optionally, the display panel further includes a first polarizer at a light-entering side of the display panel and a second polarizer at a light-outgoing side of the display panel. In the case that the display substrate is the color filter substrate of the liquid crystal display panel, the optical structure is located between the color filter substrate and the second polarizer; or in the case that the display substrate is the array substrate of the liquid crystal display panel, the optical structure is located between the array substrate and the first polarizer.

Optionally, in the case that the display substrate is the array substrate of the liquid crystal display panel, the optical structure is located between the array substrate and the first polarizer; or, in the case that the optical structure is located between the array substrate and the first polarizer, the optical structure directly contacts with each of the array substrate and the first polarizer.

A display device is provided in some embodiments of the present disclosure, including the above-described display panel.

DETAILED DESCRIPTION

To clarify technical problems to be solved by embodiments of the present disclosure, technical solutions and advantages of the present disclosure, detailed descriptions are given based on drawings in conjunction with specific embodiments.

In the related art, a particular privacy film material is attached on a display panel to achieve privacy displaying. However, the cost is high, the quality of the privacy film material is hard to control and an overall thickness of a display module may be increased.

To solve the above problems, some embodiments of the present disclosure provide a display substrate and a forming method thereof, a display panel and a display device that can achieve privacy displaying of a display device at relatively low cost.

A display substrate is provided in some embodiments, including"

a base substrate;

a display functional layer on the base substrate; and an optical structure at a side of the base substrate, where the optical structure merely allows light emissions within a predetermined range of viewing angles.

That is to say, the optical structure is used to control an angle of emergence of light from the display functional layer to be within a predetermined angle range.

It should be noted that, the optical structure may be arranged at a side of the base substrate that departs from the display functional layer; and of course, the optical structure may be arranged at a side of the base substrate close to the display functional layer, such as, arranged between the base substrate and the display functional layer.

In some embodiments of the present disclosure, the optical structure is integrated in the display substrate and merely allows light emissions in the predetermined range of viewing angles, such that the display substrate itself can achieve privacy effects and there is no need to attach any privacy film material on the display substrate, thereby reducing the cost of the display device and preventing problems caused by attaching the privacy film material.

The predetermined range of viewing angles can be determined according to actual applications. According to some embodiments, the predetermined range of viewing angles can be realized by designing the optical structure.

In a case that the display substrate in some embodiments is applied to vehicle displaying, since emergent lights from the display substrate are of relatively small viewing angles, a display image of the display substrate is prevented from generating a reflection on the car front windscreen and the sight of the driver may not be adversely affected.

In case of attaching a privacy film material on the display panel in the related technology, protective resin layers need to be arranged at both sides of the privacy film material. The protective resin layer has a thickness ranging from 100 μm to 250 μm and the privacy film material has a thickness ranging from 100 μm to 120 μm, so the display module may have a relatively large overall thickness. In some embodiments, the optical structure is directly arranged on the base substrate and directly contacts with the base substrate; in this way, the base substrate may protect the optical structure and there is no need to provide the protective resin layer between the base substrate and the optical structure. Hence, the overall thickness of the display module can be greatly reduced.

Figure 1:
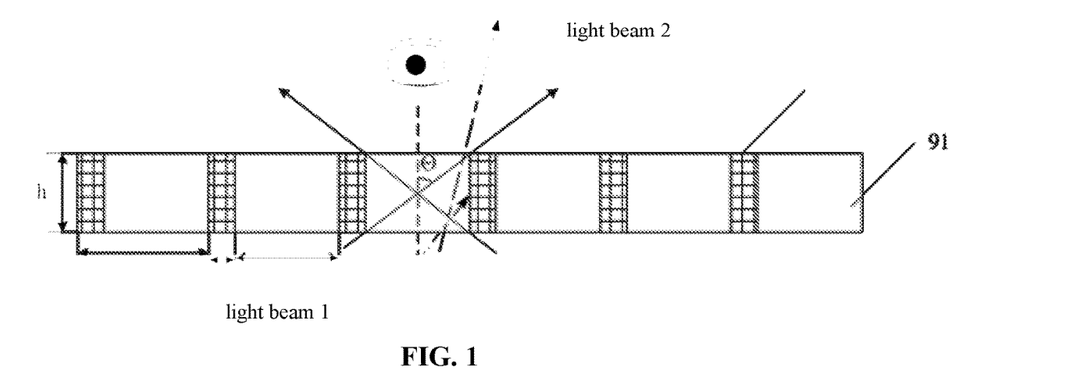
FIG. 1 is a schematic diagram of achieving privacy displaying using an optical structure in some embodiments of the present disclosure.

The optical structure can be implemented using various light modulators such as a liquid crystal cell or a grating structure. In an embodiment, to reduce the cost, the optical structure may be implemented by a plurality of light-shielding patterns formed in the display substrate, as shown in FIG. 1. An emergent light 1 of the display substrate may be affected by the light-shielding pattern and cannot be emitted out, while an emergent light 2 of the display substrate may not be affected by the light-shielding pattern and can be emitted out. In this way, a direction of an emergent light of the display substrate can be controlled through the light-shielding patterns 92.

As shown in FIG. 1, the optical structure includes:

a plurality of light-shielding patterns 92 that are spaced from each other, where each light-shielding pattern 92 extends in a second direction that is perpendicular to a first plane.

The optical structure further includes: a transparent pattern 91 filled between adjacent light-shielding patterns.

In some embodiments of the present disclosure, the optical structure includes a plurality of light-shielding patterns each extending in the second direction; in a case that an emergent light from the display substrate has a relatively large emergent angle at the first plane (for example, an angle between the light and the second direction is greater than angle Θ as shown in FIG. 1), the emergent light may be shielded by the light-shielding pattern 92 in the optical structure. That is, a maximum emergent angle of an emergent light through the optical structure at the first plane that is perpendicular to the second direction may be limited by the light-shielding patterns, emergent angles of emergent lights through the optical structure at the first plane are all smaller than a threshold Θ; hence, the privacy displaying is achieved on the first plane.

In addition, as shown in FIG. 1, the light-shielding pattern has a height of h, a distance between adjacent light-shielding patterns is b, and Θ=arctan(b/h). By designing the height of the light-shielding patterns and the distance between adjacent light-shielding patterns, an angle of an emergent light from the display substrate can be modulated.

Figure 2:
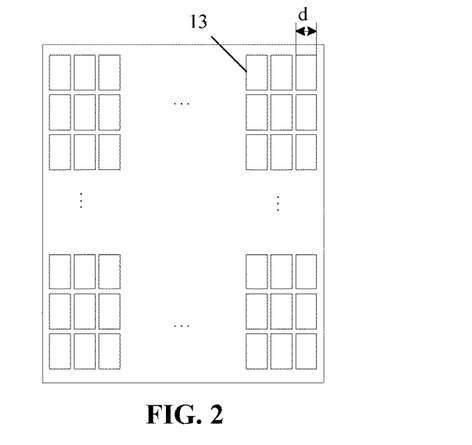
FIG. 2 is a schematic diagram of a display substrate having a plurality of pixel regions in some embodiments of the present disclosure.

Furthermore, the display substrate includes a plurality of pixel regions. A width of the light-shielding pattern is a. As shown in FIG. 2, a width of each pixel region 13 is d. A sum of a and b is not smaller than d and is not larger than 2d. If the light-shielding patterns are designed with a large period, the privacy effect may be poor. If the light-shielding patterns are designed with a small period, the display effect of the display substrate may be affected. Hence, optionally, a value of the sum of a and b is between one time of the width of the pixel region and two times of the width of the pixel region.

Figure 8:
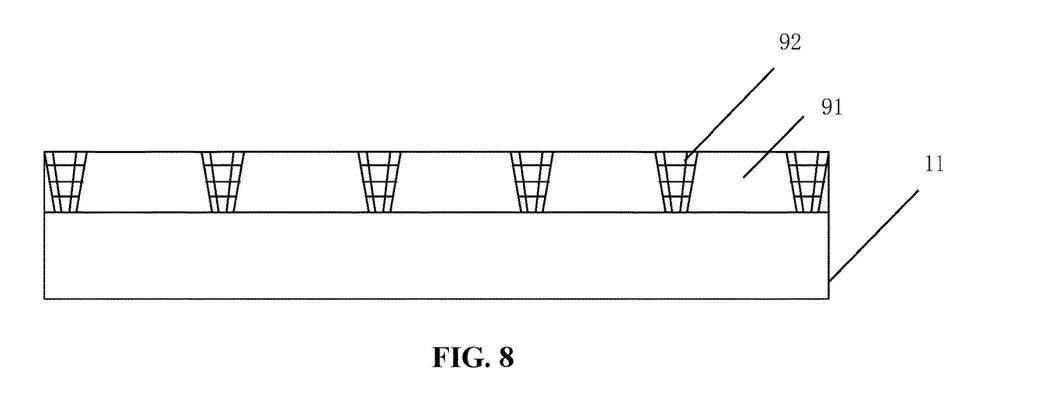
FIG. 8 is a schematic diagram of a display substrate in some embodiments of the present disclosure, which achieves privacy displaying through an optical structure.

Optionally, the light-shielding pattern 92 may be an inverted trapezoidal structure as illustrated schematically in FIG. 8. A width of a portion of the light-shielding pattern 92 at a side close to the base substrate 11 is smaller than a width of a portion of the light-shielding pattern 92 at a side away from the base substrate 11. In addition, the a plurality of light-shielding patterns 92 are spaced from each other uniformly.

The light-shielding pattern may be made of a black matrix material. To supply a flat surface for subsequent processes, transparent materials are filled between the light-shielding patterns. The transparent material may be an inorganic material such as silicon dioxide or silicon nitride, or may be an organic material such as a transparent resin. A thickness of a transparent pattern is equal to a thickness of the light-shielding pattern.

A method for forming a display substrate is provided in some embodiments, including:

providing a base substrate;

forming a display functional layer on the base substrate; and forming an optical structure at a side of the base substrate away from the display functional layer, where the optical structure merely allows light emissions within a predetermined range of viewing angles.

In some embodiments of the present disclosure, the optical structure is fabricated in the display substrate and merely allows light emissions in the predetermined range of viewing angles, such that the display substrate itself can achieve privacy effects and there is no need to attach any privacy film material on the display substrate, thereby reducing the cost of the display device and preventing problems caused by attaching the privacy film material.

In a case that the display substrate in some embodiments is applied to vehicle displaying, since emergent lights from the display substrate are of relatively small viewing angles, a display image of the display substrate is prevented from generating a reflection on the car front windscreen and the sight of the driver may not be adversely affected.

Furthermore, the step of forming the optical structure at the side of the base substrate away from the display functional layer includes:

directly forming the optical structure on a surface of the base substrate away from the display functional layer, where the formed optical structure directly contacts with the base substrate.

In case of attaching a privacy film material on the display panel in the related technology, protective resin layers need to be arranged at both sides of the privacy film material. The protective resin layer has a thickness ranging from 100 μm to 250 μm and the privacy film material has a thickness ranging from 100 μm to 120 μm, so the display module may have a relatively large overall thickness. In the embodiment, the optical structure is directly fabricated on the base substrate and directly contacts with the base substrate; in this way, the base substrate may protect the optical structure and there is no need to provide the protective resin layer between the base substrate and the optical structure. Hence, the overall thickness of the display module can be greatly reduced.

The optical structure can be implemented using various light modulators such as a liquid crystal cell or a grating structure. In an embodiment, to reduce the cost, the optical structure may be implemented by a plurality of light-shielding patterns formed in the display substrate, as shown in FIG. 1. An emergent light 1 of the display substrate may be affected by the light-shielding pattern and cannot be emitted out, while an emergent light 2 of the display substrate may not be affected by the light-shielding pattern and can be emitted out. In this way, a direction of an emergent light of the display substrate can be controlled through the light-shielding patterns.

Optionally, the forming the optical structure at the side of the base substrate away from the display functional layer includes:

forming a light-shielding layer at the side of the base substrate away from the display functional layer; and patterning the light-shielding layer to form a plurality of light-shielding patterns that are spaced from each other, where each light-shielding pattern extends in a second direction that is perpendicular to a first plane.

After the step of forming the light-shielding patterns that are spaced from each other, the method further includes:

filling transparent materials between adjacent light-shielding patterns.

A maximum emergent angle of an emergent light through the optical structure at the first plane that is perpendicular to the second direction may be limited by the light-shielding patterns, emergent angles of emergent lights through the optical structure at the first plane are all smaller than a threshold Θ; hence, privacy displaying is achieved on the first plane.

Optionally, air rather than the transparent pattern may be provided between adjacent light-shielding patterns, which is not limited in embodiments of the present disclosure.

As shown in FIG. 1, the light-shielding pattern has a height of h, a distance between adjacent light-shielding patterns is b, and Θ=arctan(b/h). When forming the optical structure, the height of the light-shielding patterns and the distance between adjacent light-shielding structures can be adjusted based on a required angle of an emergent light from the display substrate.

Specifically, as shown in FIG. 3 to FIG. 6, the step of forming the optical structure at the side of the base substrate away from the display functional layer includes the following steps 1 to 4.

Figure 3:
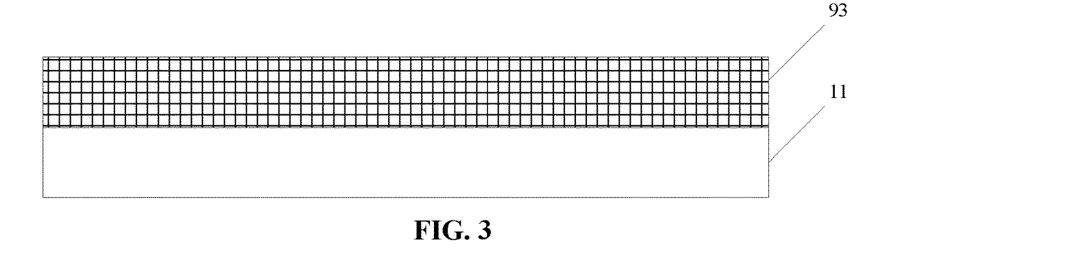
FIG. 3 to FIG. 6 schematically shows a flow of forming an optical structure in some embodiments of the present disclosure.

Step 1, as shown in FIG. 3, is to form a light-shielding layer 93 on the base substrate 11.

A display functional layer is formed at another side of the base substrate 11. Step 1 is to form the light-shielding layer 93 at a side of the base substrate where no display functional layer is formed. Specifically, the light-shielding layer 93 may be made of a black photosensitive material.

Figure 4:
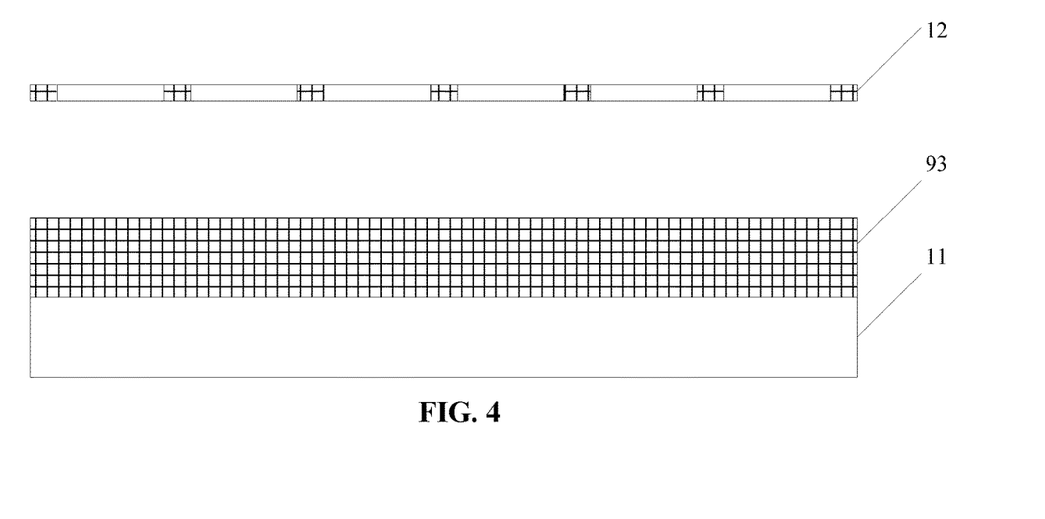

Step 2, as shown in FIG. 4, is to expose the light-shielding layer 93 using a mask plate 12.

The mask plate 12 includes nonopaque regions and opaque regions. The opaque regions correspond to the light-shielding patterns 92.

Figure 5:
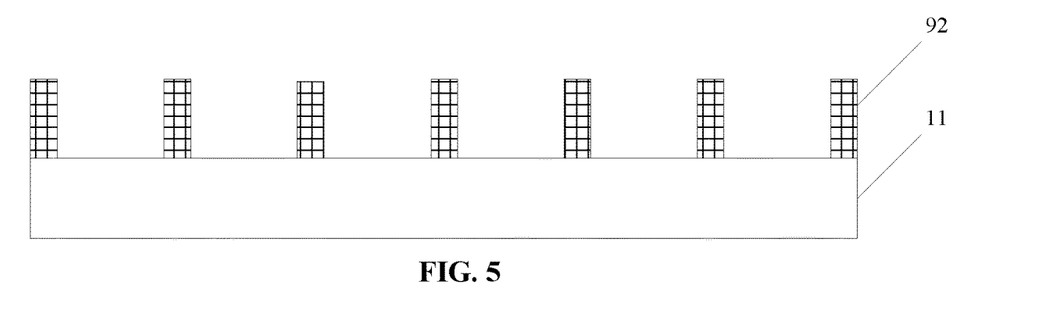

Step 3, as shown in FIG. 5, is to develop the exposed light-shielding layer 93 to form light-shielding patterns 92 that are spaced from each other.

Figure 6:
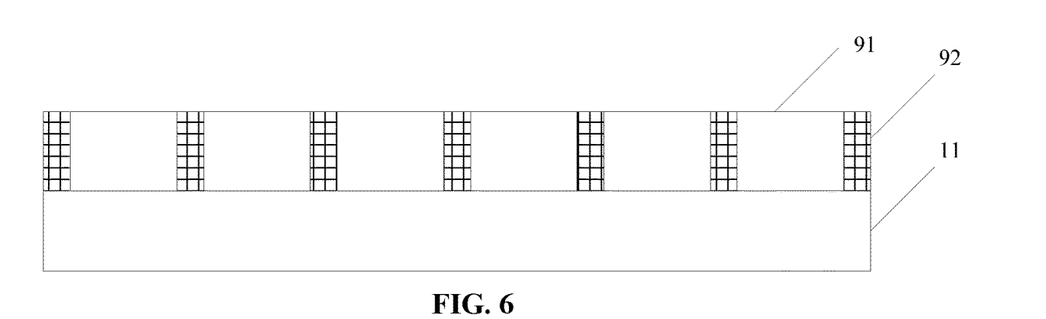

Step 4, as shown in FIG. 6, is to fill transparent materials between adjacent light-shielding patterns 92 to form transparent patterns 91.

The transparent material may be an inorganic material such as silicon dioxide or silicon nitride, or may be an organic material such as a transparent resin. A thickness of the transparent pattern 91 is equal to a thickness of the light-shielding pattern 92. The arrangement of the transparent patterns 91 may supply a flat surface for subsequent processes.

Figure 9:
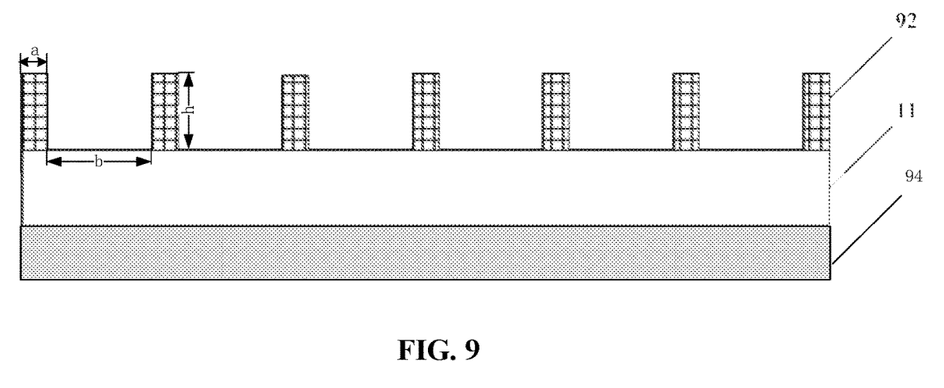
FIG. 9 is a schematic diagram of a display substrate in some embodiments of the present disclosure, which achieves privacy displaying through an optical structure.
Figure 10:
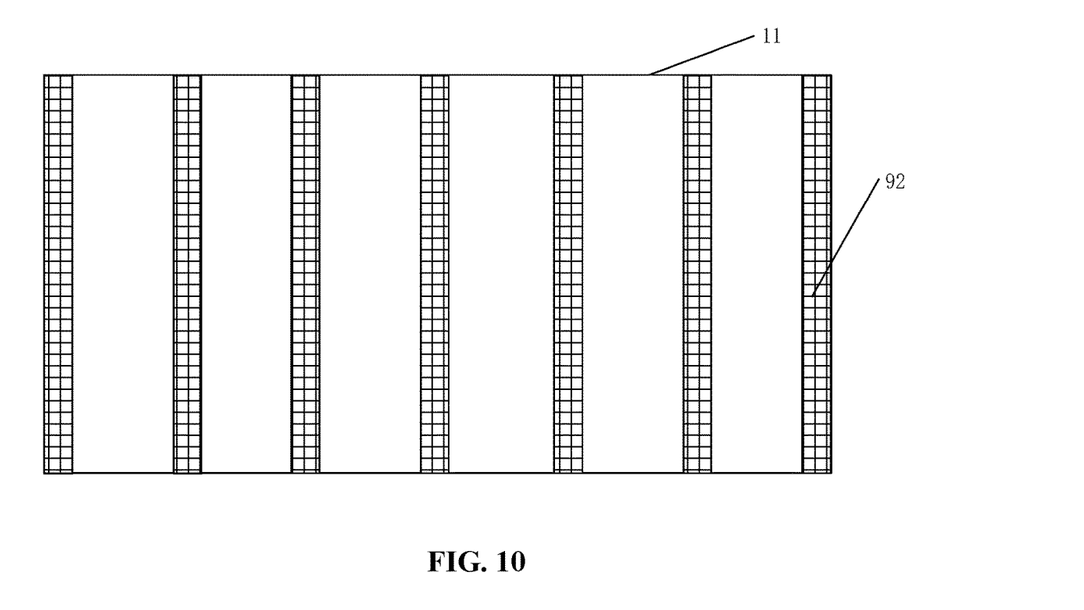
FIG. 10 is a top view of a display substrate in some embodiments of the present disclosure, which achieves privacy displaying through an optical structure.

Exemplarily, as shown in FIG. 9, the optical structure 92 is formed at a side of the base substrate 11 away from the display functional layer 94. Optionally, FIG. 10 illustrates a top view of a display substrate that achieves privacy displaying through the optical structure according to embodiments of the present disclosure. For example, the light-shielding patterns may be a grid structure; however, it is understood that the specific shape of the light-shielding patterns is not limited in the embodiments of the present disclosure.

A display panel is provided in some embodiments, including the above-described display substrate.

In addition, the display panel is a liquid crystal display panel. The display panel includes a color filter substrate and an array substrate opposite to each other. In a case that the display substrate is the color filter substrate, the optical structure is at a side of the color filter substrate away from the array substrate. In a case that the display substrate is the array substrate, the optical structure is at a side of the array substrate away from the color filter substrate. That is, the optical structure is at a light-entering side or a light-outgoing side.

In a case that the display panel is the liquid crystal display panel, the display panel further includes a first polarizer at the light-entering side of the display panel and a second polarizer at the light-outgoing side. In a case that the display substrate is the color filter substrate of the liquid crystal display panel, the optical structure is located between the color filter substrate and the second polarizer. In a case that the display substrate is the array substrate of the liquid crystal display panel, the optical structure is located between the array substrate and the first polarizer.

In the case that the optical structure is located between the color filter substrate and the second polarizer, the optical structure directly contacts with each of the color filter substrate and the second polarizer.

In the case that the optical structure is located between the array substrate and the first polarizer, the optical structure directly contacts with each of the array substrate and the first polarizer.

In case of attaching a privacy film material on the display panel in the related art, protective resin layers need to be arranged at both sides of the privacy film material to protect the privacy film material from being damaged. The protective resin layer has a thickness ranging from 100 μm to 250 μm and the privacy film material has a thickness ranging from 100 μm to 120 μm, so the display module may have a relatively large overall thickness.

In some embodiments of the present disclosure, the optical structure is arranged between the color filter substrate and the second polarizer and directly contacts with each of the color filter substrate and the second polarizer, there is no need to provide the protective resin layers at both sides of the optical structure, thereby greatly reducing the overall thickness of the display panel. Or, the optical structure is arranged between the array substrate and the first polarizer and directly contacts with the array substrate and the first polarizer, there is no need to provide the protective resin layers at both sides of the optical structure, thereby greatly reducing the overall thickness of the display panel. Compared with the related art, the overall thickness of the display panel can be reduced by 200 μm to 500 μm, which facilitates achieving light and thin display products.

A display device is provided in some embodiments, including the above-described display panel. The display device may be a liquid crystal television, a liquid crystal display, a digital photo frame, a cellular phone, a tablet computer and any product or component having a display function. The display device further includes a flexible circuit board, a printed circuit board and a backboard.

In a case that the display device in some embodiments of the present disclosure is applied to vehicle displaying, since emergent lights from the display substrate are of relatively small viewing angles, a display image of the display device is prevented from generating a reflection on the car front windscreen and the sight of the driver may not be adversely affected.

In a case that the display device is a liquid crystal display device, the display device further includes a first polarizer at a light-entering face of the display panel and a second polarizer at a light-outgoing face of the display panel. In a case that the display substrate is the color filter substrate of the liquid crystal display panel, the optical structure is located between the color filter substrate and the second polarize. In a case that the display substrate is the array substrate of the liquid crystal display panel, the optical structure is located between the array substrate and the first polarizer.

Figure 7:
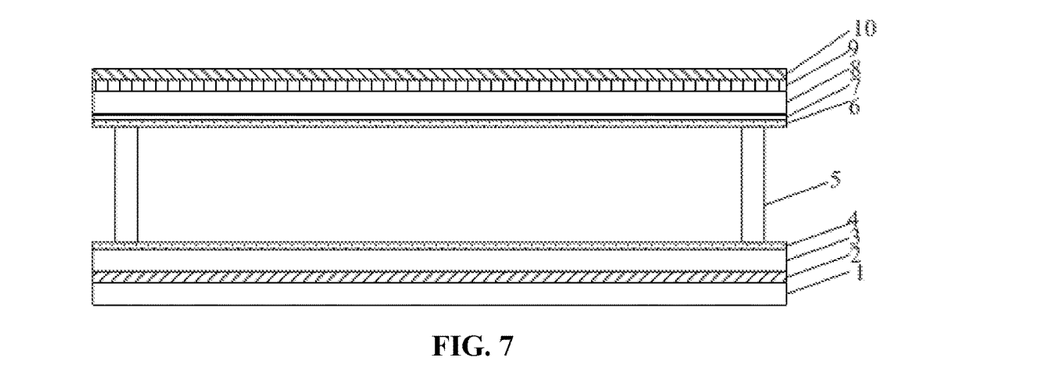
FIG. 7 is a schematic structural diagram of a display device in some embodiments of the present disclosure.

In some embodiments of the present disclosure, as shown in FIG. 7, the display device includes a display panel, a backlight source 1, a first polarizer 2 and a second polarizer 10. The display panel includes an array substrate 3 and a color filter substrate 8 that are arranged opposite to each other, and a sealant 5. A black matrix 7 and an alignment layer 6 are arranged on the color filter substrate 8. An alignment layer 4 and a thin-film transistor array (not shown in FIG. 7) are arranged on the array substrate 3. The first polarizer 2 is located between the array substrate 3 and the backlight source 1. The second polarizer 10 is at a side of the color filter substrate 8 away from the array substrate 3. In some embodiments of the present disclosure, an optical structure is arranged between the second polarizer 10 and the color filter substrate 8. When light of the display panel emerges via the optical structure 9, the optical structure 9 merely allows light emission within a predetermined range of viewing angles. Therefore, the display device itself can achieve privacy effect and there is no need to attach privacy film material, reducing the cost of the display device and preventing problems caused by attaching the privacy film material.

Unless otherwise defined, technical terms or scientific terms used in the present disclosure shall have common meanings understood by the ordinary skilled in the art. Terms such as "first" and "second" in the present disclosure do not indicate any order, quantity of importance, they are merely used to distinguish different components. Terms such as "include" or "contain" indicate that an element or object before such terms covers an element, an object or the equivalent enumerated after such terms, and do not exclude other elements and objects. Terms such as "coupled" and "connected" are not used to limit physical or mechanical connections, they can be direct or indirect electrical connections. Terms such as "above", "below", "left" and "right" merely indicate relative position relationships; when an absolute position of a described object changes, position relationships with respect to the described object changes accordingly.

It should be noted that when an element such as a layer, a film, a region or a substrate is located on or below another element, the element can be directly on or below the other element or there may be an intermediate element between these elements.

Optional embodiments are described hereinabove. It should be noted that, various improvements and punishments can be made by those ordinary skilled in the art without departing from the principle of the present disclo-

What is claimed is:

1. A display substrate, comprising:
    a base substrate;
    a display functional layer on the base substrate; and
    an optical structure at a side of the base substrate, wherein the optical structure is configured to control an emergent angle of light from the display functional layer to be within a predetermined angle range;
    wherein the optical structure comprises a plurality of light-shielding patterns spaced from each other and an extending direction of each light-shielding pattern is perpendicular to a first plane, wherein the first plane is parallel to the base substrate;
    wherein each light-shielding pattern has a uniform width in a direction perpendicular to the extending direction;
    wherein an emergent angle of emergent light via the optical structure at the first plane is smaller than a threshold $\Theta$, a height of each light-shielding pattern is h, and a distance between adjacent light-shielding patterns is b, where $\Theta=\arctan(b/h)$;
    wherein the display substrate further comprises a plurality of pixel regions, wherein a width of each pixel region is d, and a sum of a and b is not smaller than d and not larger than 2d.

2. The display substrate according to claim 1, wherein in a direction perpendicular to the extending direction, a width of a portion of each light-shielding pattern close to the base substrate is smaller than a width of a portion of the light-shielding pattern away from the base substrate.

3. The display substrate according to claim 1, wherein the optical structure further comprises a transparent pattern filled between adjacent light-shielding patterns.

4. The display substrate according to claim 3, wherein a height of the transparent pattern is equal to the height of each light-shielding pattern.

5. The display substrate according to claim 1, wherein the optical structure is at a side of the base substrate away from the display functional layer.

6. A display panel comprising the display substrate according to claim 1.

7. The display panel according to claim 6, wherein
    the display panel is a liquid crystal display panel, the display panel comprises a color filter substrate and an array substrate opposite to each other;
    the display substrate is the color filter substrate and the optical structure is at a side of the color filter substrate away from the array substrate; or the display substrate is the array substrate and the optical structure is at a side of the array substrate away from the color filter substrate.

8. The display panel according to claim 7, further comprising a first polarizer at a light-entering side of the display panel and a second polarizer at a light-outgoing side of the display panel;
    the display substrate is the color filter substrate of the liquid crystal display panel, the optical structure is between the color filter substrate and the second polarizer; or
    the display substrate is the array substrate of the liquid crystal display panel, the optical structure is between the array substrate and the first polarizer.

9. The display panel according to claim 8, wherein
    the optical structure is between the color filter substrate and the second polarizer, the optical structure directly contacts with the color filter substrate and the second polarizer; or
    the optical structure is between the array substrate and the first polarizer, the optical structure directly contacts with the array substrate and the first polarizer.

10. A display device comprising the display panel according to claim 6.

11. A method for forming a display substrate, comprising:
    providing a base substrate;
    forming a display functional layer on the base substrate; and
    forming an optical structure at a side of the base substrate, wherein the optical structure is configured to control an emergent angle of light from the display functional layer to be within a predetermined angle range;
    wherein the forming the optical structure at the side of the base substrate away from the display functional layer comprises:
    forming a light-shielding layer at the side of the base substrate away from the display functional layer; and
    patterning the light-shielding layer to form a plurality of light-shielding patterns spaced from each other, wherein an extending direction of each light-shielding pattern is perpendicular to a first plane, the first plane is parallel to the base substrate;
    wherein each light-shielding pattern has a uniform width in a direction perpendicular to the extending direction;
    wherein an emergent angle of emergent light via the optical structure at the first plane is smaller than a threshold $\Theta$, a height of each light-shielding pattern is h, and a distance between adjacent light-shielding patterns is b, where $\Theta=\arctan(b/h)$;
    wherein the display substrate further comprises a plurality of pixel regions, wherein a width of each pixel region is d, and a sum of a and b is not smaller than d and not larger than 2d.

12. The method according to claim 11, wherein after the forming the plurality of light-shielding patterns spaced from each other, the method further comprises: filling transparent materials between adjacent light-shielding patterns.

* * * * *